United States Patent
Bayer

(10) Patent No.: US 6,575,336 B1
(45) Date of Patent: Jun. 10, 2003

(54) DOSING CONTAINER FOR REPEATEDLY WITHDRAWING FLOWABLE ADMINISTRATION PRODUCTS USED IN HEALTHCARE

(75) Inventor: Michael Bayer, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/787,645

(22) PCT Filed: Sep. 10, 1999

(86) PCT No.: PCT/EP99/06704

§ 371 (c)(1),
(2), (4) Date: Mar. 20, 2001

(87) PCT Pub. No.: WO00/17061

PCT Pub. Date: Mar. 30, 2000

(30) Foreign Application Priority Data

Sep. 23, 1998 (DE) .......................................... 198 43 554

(51) Int. Cl.⁷ ................................................. B67D 5/38
(52) U.S. Cl. ........................... 222/158; 222/31; 222/49; 222/154; 222/155; 73/428; 116/227; 116/321; 116/323; 33/494; 33/679.1
(58) Field of Search ................. 222/158, 159, 222/154, 155, 31, 49; 73/428; 116/227, 276, 321, 323, 324; 33/494, 485, 522, 679.1

(56) References Cited

U.S. PATENT DOCUMENTS

| | | | | | |
|---|---|---|---|---|---|
| 1,589,025 A | * | 6/1926 | Wilson | .......................... | 222/29 |
| 2,487,825 A | * | 11/1949 | Olvis | .......................... | 222/439 |
| 3,672,061 A | * | 6/1972 | Alessi | .......................... | 33/169 |
| 3,941,129 A | | 3/1976 | Pleznac | .................. | 128/218 R |
| 4,085,616 A | * | 4/1978 | Patel et al. | .................... | 73/215 |
| 4,085,866 A | * | 4/1978 | Fekl | ........................... | 222/158 |
| 4,445,370 A | * | 5/1984 | Whitmire | ...................... | 73/290 |
| 4,495,709 A | * | 1/1985 | Mainenti | ...................... | 33/484 |
| 4,550,602 A | * | 11/1985 | Burke, Sr. et al. | ............. | 73/428 |
| 4,762,251 A | * | 8/1988 | Berger | .......................... | 222/49 |
| 4,921,138 A | * | 5/1990 | Quinn et al. | ................... | 222/85 |
| 4,925,066 A | * | 5/1990 | Rosenbaum | ................ | 222/192 |
| 5,054,656 A | | 10/1991 | Lasner | ......................... | 222/158 |
| 5,108,016 A | * | 4/1992 | Waring | ......................... | 222/468 |
| 5,165,576 A | * | 11/1992 | Hickerson | .................... | 222/158 |
| 5,447,245 A | * | 9/1995 | Merhar | .......................... | 215/6 |
| 5,469,993 A | | 11/1995 | Hauf et al. | ............... | 222/383.3 |
| 5,607,078 A | * | 3/1997 | Nordberg et al. | ........... | 220/756 |
| 5,622,285 A | * | 4/1997 | Lee | ................................ | 222/158 |
| 5,699,937 A | * | 12/1997 | Canela | ......................... | 222/129 |
| 5,746,349 A | * | 5/1998 | Putteman et al. | ............. | 222/49 |
| 5,881,597 A | * | 3/1999 | Brooks | .......................... | 73/428 |
| 6,112,779 A | * | 9/2000 | Camilla | ........................ | 141/23 |

FOREIGN PATENT DOCUMENTS

| | | |
|---|---|---|
| CH | 410 282 | 10/1966 |
| WO | 95/01924 | 1/1995 |

* cited by examiner

*Primary Examiner*—Ehud Gartenberg
*Assistant Examiner*—Frederick C Nicolas

(57) ABSTRACT

A dosing container (1) made of transparent material which is useful for the multiple removal of a free-flowing application product for a subject animal or human health, having a filling section (6) which is of a constant cross section over its filling height (3), and having adjustably secured to the container a dosing slide (10, 23) having a scale (11, 22), which slide can be adjusted over the filling height (3) of the container (5), and which can be set at the beginning of a treatment to a filling height (15) indicated by a scale value (14) corresponding to the body weight of the subject to be treated and which setting reaches filling height 16 corresponding to the scale value zero (12) at the end of a treatment.

29 Claims, 2 Drawing Sheets

Figure 1:
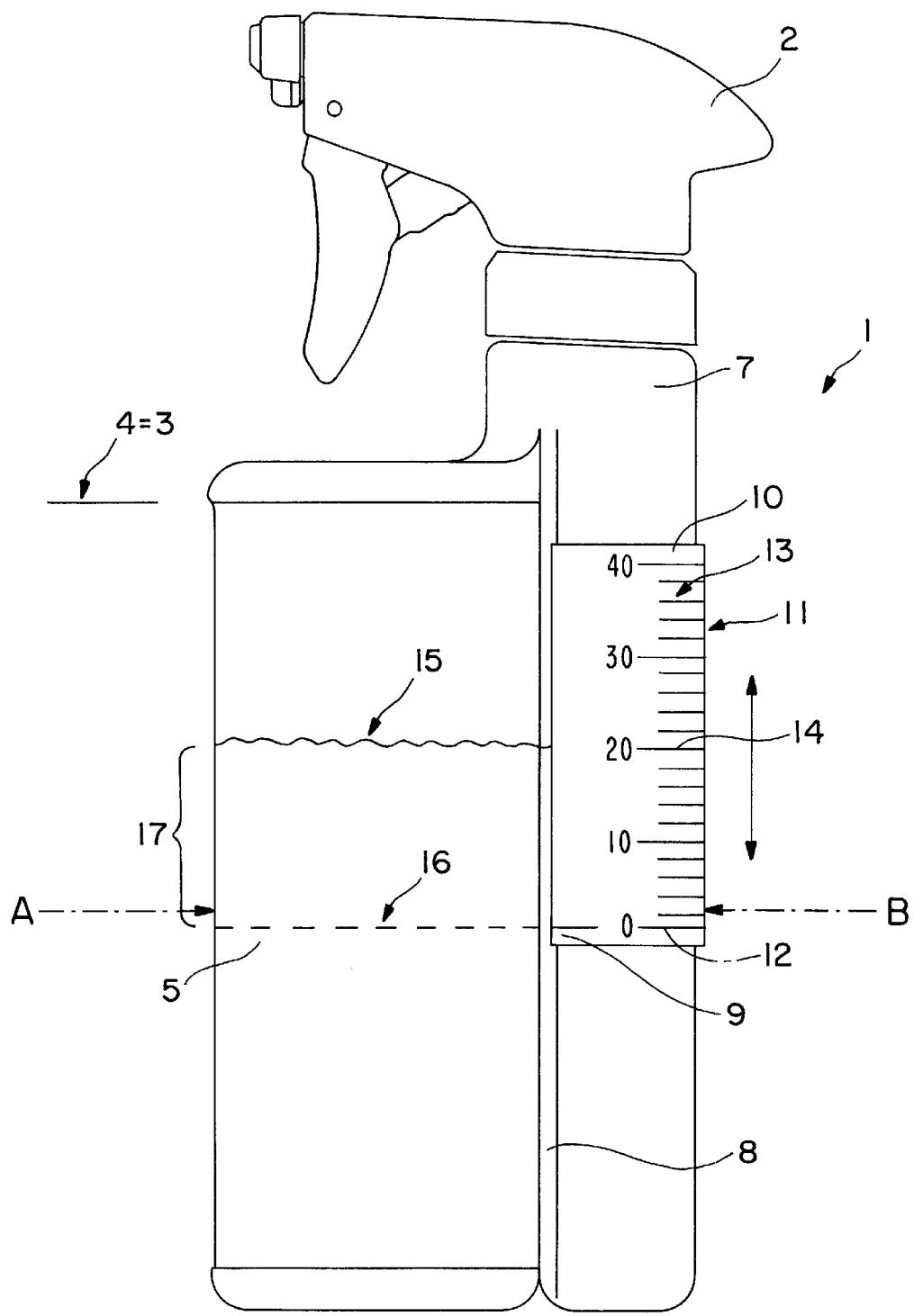

DOSING CONTAINER FOR REPEATEDLY WITHDRAWING FLOWABLE ADMINISTRATION PRODUCTS USED IN HEALTHCARE

The invention relates to a dosing container made of transparent material for the multiple removal of free-flowing application products for animal or human health, having a filling cross section which is constant over the entire filling height provided.

In many application products, in particular for animal health, e.g. in medication for animals or in products for controlling parasites, the quantity which is to be administered or the volume per treatment is dependent on the body weight of the animal which is to be treated. It is also possible for this body weight to vary greatly within the same species, for example in dogs. For the respective animal owner, this means that it is necessary to remove from a product container precisely the product volume which is correct for his animal, for which purpose the product manufacturer has usually produced instructions for application and enclosed these in the pack.

With free-flowing, i.e. liquid to slightly pasty, preparations which are to be administered orally, or with pulverulent to granular preparations, a measuring beaker or measuring spoon is usually included in the container or the pack. The disadvantage here is that the necessary measuring vessel is enclosed in loose form. Screw caps with a dosing scale cannot be used in all cases and, moreover, have the disadvantage that they only have a small volume, and that they require some skill to fill. Containers for liquid products often have a measuring scale printed thereon or impressed therein, said scale making a dosing operation possible by comparison with the respective filling level.

With spray preparations, use is made, inter alia, of the conventional spray containers with hand-actuatable spray pump. The dosing operation, however, poses problems. The manufacturer can indeed determine a certain displacement volume for each spray stroke, and this is given in table form for the treatment per kg of body weight. However, once the user has read from the table the necessary number of strokes in accordance with the weight of his animal, he has to count the strokes precisely during each application. For example, with a treatment volume of 50 ml and a delivery of 1 ml per spray stroke, 50 strokes would be necessary. With such large product quantities which are to be sprayed on, this is unreasonable for the user and may easily result, by way of miscounting, in imprecise metering operations.

The object is to provide, for the multiple removal of free-flowing application products for human or animal health, a dosing container which can be easily handled and can carry out a sufficiently precise metering operation, the associated outlay being in a favourable proportion to the benefits.

This object is achieved by a dosing slide which is provided with a scale, can be adjusted over the entire filling height of said dosing container, is retained on said dosing container by clamping action and can be set to the current filling height by a certain scale value.

Obviously, for a precise determination of the treatment volume, the dosing container has to be located in the vertical position at the beginning and end of the treatment.

It is advantageous here that, once the scale value has been set by means of the dosing slide in the vertical position of said dosing container, it is possible to dose application product until the filling height has dropped to the zero value of the scale in the vertical position of the dosing container.

In addition to the sufficiently free-flowing application products, the novel dosing container is suitable, in particular, for liquid application products.

According to a preferred embodiment, it is advantageous for the scale of the dosing slide to extend from a zero value to at least the maximum conventional body weight of the subject (animal or human) which is to be treated, and for the scale to be coordinated with the application-product volume which is to be dosed per kilogram of body weight of the subject which is to be treated, it being possible for the scale value corresponding to the current body weight of the subject which is to be treated to be set to the filling height in the dosing region in the vertical position of the dosing container, and the zero value of the scale indicating, in the vertical position of the dosing container, the filling height remaining following the treatment of the subject.

It goes without saying that the novel idea also covers the inverse case, i.e. where the scale runs vertically downwards from a zero value. In this case, by means of the dosing slide, the zero value of the scale is set to the initial filling height of the dosing container and the dosing operation then takes place until in the vertical position of the dosing container, with the new filling height which is lower by the treatment volume, the scale value corresponding to the body weight of the subject which is to be treated has been reached. The disadvantage here, however, is that it is constantly necessary to look for said scale value, or the latter has to be marked beforehand. In contrast, in the normal embodiment, the zero value of the scale can always be seen clearly as the mark for the remaining filling height.

According to a specific embodiment, the novel dosing container is characterized by in each case one vertical guide rail on each side for an engaging clamping runner arranged on the dosing slide.

This achieves the situation where the, for example, flank-like or clamp-like clamping runners of the dosing slide subject the dosing container to a clamping action in the direction transverse to said container. The design as a flat or narrow dosing container fits in well with the arrangement of guide rails with a corresponding configuration of the dosing slide. However, it is also possible for the clamping action to take place in the direction of the flat or broad sides of the dosing container.

It should, obviously, be ensured that the clamping action is of the correct magnitude. If it is too low, the dosing slide slips undesirably of its own accord; if it is too firm, the dosing slide can only be adjusted with difficulty, if at all. Since both the dosing container and the dosing slide usually consist of plastic, for example polyethylene, at least one of the two parts may be designed with the necessary elasticity.

The dosing slide preferably consists of transparent material.

This has the advantage that the specific scale value can be better set to the current filling height in the vertical position of the dosing container. If the scale runs on both sides of the dosing slide, or if two identical scales are located precisely opposite one another, then the specific scale value can be set particularly well to the current filling height by the dosing slide by the marks corresponding to the scale value being made to coincide.

According to a specific embodiment, the dosing container comprises a spray container.

It has been found that the novel dosing container is particularly suitable for spray application, that is to say in particular for the treatment of animals infested with parasites.

The scale of the dosing slide usually runs linearly, i.e. the graduation of the scale has identically sized scale values, with the result that the spacing between two scale values always corresponds to the same metering volume.

According to an advantageous variant, however, the scale of the dosing slide has a scale graduation which changes over its length.

This is advantageous if light and heavy subjects of the same species or of different species are to be administered different dosing quantities per kilogram of body weight. This means that the spacing between scale marks in the bottom scale region differs from that in the top scale region, the transition usually being continuous.

Accordingly, on account of empirical determinations, it is possible for the scale to run, for example, in accordance with a potential or exponential function or a logarithmic function, with the result that subjects of the same species with a low body weight, for example lap dogs, are assigned either a larger or smaller dosing volume per kilogram of body weight than subjects with a higher body weight, for example mastiffs. The novel dosing container can thus be used over a relatively large range.

The dosing slide can preferably be exchanged for one in which the scale has a different graduation.

It is thus possible, at least theoretically, to use the same dosing container for different application products and application cases. The exchangeability does not pose any problems since the material of the dosing container and/or dosing slide is usually sufficiently elastic.

According to a further specific embodiment, the dosing slide has a plurality of scales with different graduations.

It is thus the case that in each case one scale is arranged, for example, on each flank of the dosing slide, it being possible for one of said scales to be used, for example, for the treatment of dogs and the other to be used for the treatment of cats, that is to say, as it was, one of the scales is arranged on the front side, and the other is arranged on the rear side, of the dosing slide. With the same application product for different species, the user advantageously requires just a single dosing container for these two species.

Figure 2:
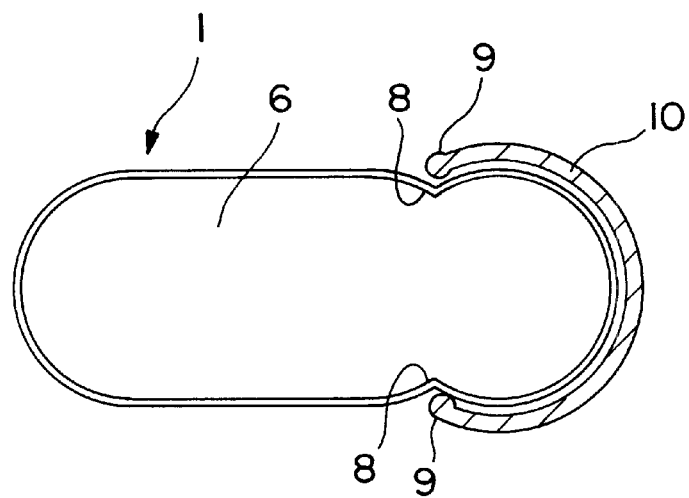
Figure 3:
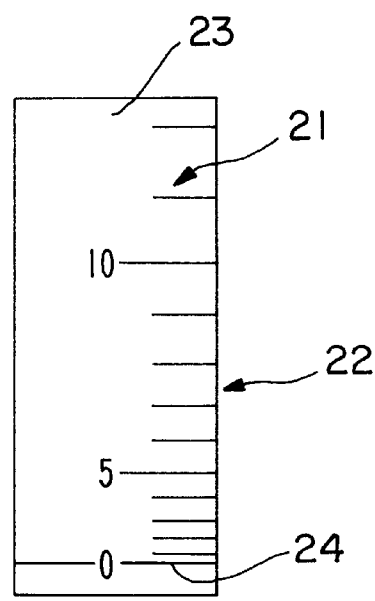

The novel dosing container is illustrated purely schematically in the form of a spray container in an exemplary embodiment and is explained in more detail hereinbelow. In the figures:

FIG. 1 shows the spray container in side view,
FIG. 2 shows the spray container in accordance with section A-B in FIG. 1, and
FIG. 3 shows a dosing slide with a specific scale graduation in side view.

In FIGS. 1 and 2, the spray container 1 has a commercially available spray head 2 screwed on it. The overall filling height 3 corresponds to the height 4 of the actual filling container 5, which has the same filling cross section 6 throughout and is adjoined, in the direction of the spray head 2, by a neck 7. The actual filling container 5 has vertically running guide rails 8 on both sides, clamping runners 9 of a dosing slide 10 consisting of transparent material engaging in said guide rails. Said dosing slide 10 is provided with a scale 11 which is coordinated with a dosing quantity per kilogram of body weight of the animal which is to be treated, in that the scale marks indicate the body-weight range of the species which is to be treated. The scale 11 runs upwards from a zero value 12 and extends, in a linear graduation 13, to what experience has shown as being the maximum body weight of the species which is to be treated. The current body weight of the animal which is to be treated can be read as scale value 14 from the scale 11, and this can be set to the level of the current filling height 15 by means of the dosing slide 11 in the vertical position of the spray container 1. The treatment may then be carried out and is to be brought to an end as soon as the new filling height 16 has been reached, said new filling height corresponding to the level of the zero value 12 in the vertical position of the spray container 1 and with the position of the dosing slide 10 unchanged. This application-product treatment volume 17 thus corresponds to the filling-volume difference between the zero value 12 and the scale value 14 corresponding to the body weight of the animal. Arranged on the rear side of the dosing slide 10 is a second scale 11, of which the graduation has a smaller spacing between marks and which is provided for the treatment of a different species. This obviously presupposes that, on the one hand, the application product located in the spray container 1 has to be suitable for both species and that, on the other hand, different dosing quantities have been prescribed per kilogram of body weight of the two species of animal. The user may then select the associated scale in accordance with the species.

In FIG. 3, the graduation 21 of the scale 22 of the dosing slide 23 changes over its length. From the zero value 24 upwards, the spacing between marks increases continuously, that is to say smaller animals, in relative terms, of the same species are assigned a smaller dosing volume per kilogram of body weight than the larger animals. Of course, it is also possible for the spacing between marks to decrease upwards should a smaller dosing quantity be prescribed for larger animals. This need not be illustrated specifically.

What is claimed is:

1. Dosing container (1) made of transparent material for the multiple removal of a free-flowing application product for a subject animal or human health, having a filling section (6) which is of a constant cross section over its filling height (3) and having adjustably secured to the container a dosing slide (10, 23) which is provided with a scale (11, 22), which can be adjusted over the filling height (3) of the container (5) and which can be set to a filling height (15) by a scale value (14).

2. Dosing container according to claim 1, characterized in that the scale (11, 22) of the dosing slide (10, 23) extends from a zero value (12, 24) to a maximum conventional body weight of the subject which is to be treated, and in that the scale (11, 22) Is coordinated with a volume of the application-product which is to be dosed per kilogram of body weight of the subject which, is to be treated, wherein the scale value (14) corresponding to the body weight of the subject which is to be treated is settable to the filling height (15) in the dosing container (1) in the vertical position of the dosing container (1), and the zero value (12, 24) of the scale indicating, in the vertical position of the dosing container (1), the filling height (16) remaining following the treatment of the subject.

3. Dosing container according to claim 1, characterized by a vertical guide rail (8) on each side for engaging guide runners (9) arranged on the dosing slide (10).

4. Dosing container according to claim 1, characterized in that the dosing slide (10, 23) consists of transparent material.

5. Dosing container according to claim 1, characterized in that it comprises a spray container (1).

6. Dosing container according to claim 1, characterized by the scale (22) of the dosing slide (23) having a graduation (21) which changes over its length.

7. Dosing container according to claim 1, characterized in that the dosing slide (10, 23) can be exchanged for one in which the scale (11, 22) has a different graduation (13, 21).

8. Dosing container according to claim 1, characterized in that the dosing slide (10) has a plurality of different scales (11, 22).

9. Dosing container according to claim 2, characterized by a vertical guide rail (8) on each side for engaging guide runners (9) arranged on the dosing slide (10).

10. Dosing container according to claim 2, characterized in that the dosing slide (10, 23) consists of transparent material.

11. Dosing container according to claim 3, characterized in that the dosing slide (10, 23) consists of transparent material.

12. Dosing container according to claim 2, characterized in that it comprises a spray container.

13. Dosing container according to claim 3, characterized in that it comprises a spray container.

14. Dosing container according to claim 4, characterized in that it comprises a spray container.

15. Dosing container according to claim 2, characterized by the scale (22) of the dosing slide (23) having a graduation (21) which changes over its length.

16. Dosing container according to claim 3, characterized by the scale (22) of the dosing slide (23) having a graduation (21) which changes over its length.

17. Dosing container according to claim 4, characterized by the scale (22) of the dosing slide (23) having a graduation (21) which changes over its length.

18. Dosing container according to claim 5, characterized by the scale (22) of the dosing slide (23) having a graduation (21) which changes over its length.

19. Dosing container according to claim 2, characterized in that the dosing slide (10, 23) can be exchanged for one in which the scale (11, 22) has a different graduation (13, 21).

20. Dosing container according to claim 3, characterized in that the dosing slide (10, 23) can be exchanged for one in which the scale (11, 22) has a different graduation (13, 21).

21. Dosing container according to claim 4, characterized in that the dosing slide (10, 23) can be exchanged for one in which the scale (11, 22) has a different graduation (13, 21).

22. Dosing container according to claim 5, characterized in that the dosing slide (10, 23) can be exchanged for one in which the scale (11, 22) has a different graduation (13, 21).

23. Dosing container according to claim 6, characterized in that the dosing slide (10, 23) can be exchanged for one in which the scale (11, 22) has a different graduation (13, 21).

24. Dosing container according to claim 2, characterized in that the dosing slide (10) has a plurality of different scales (11, 22).

25. Dosing container according to claim 3, characterized in that the dosing slide (10) has a plurality of different scales (11, 22).

26. Dosing container according to claim 4, characterized in that the dosing slide (10) has a plurality of different scales (11, 22).

27. Dosing container according to claim 5, characterized in that the dosing slide (10) has a plurality of different scales (11, 22).

28. Dosing container according to claim 6, characterized in that the dosing slide (10) has a plurality of different scales (11, 22).

29. Dosing container according to claim 7, characterized in that the dosing slide (10) has a plurality of different scales (11, 22).

* * * * *